US006885551B2

(12) United States Patent
Chen

(10) Patent No.: US 6,885,551 B2
(45) Date of Patent: Apr. 26, 2005

(54) PERIPHERAL DEVICE FIXING MODULE

(75) Inventor: Hsiao-Liang Chen, Pan Chiao (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 10/654,903

(22) Filed: Sep. 5, 2003

(65) Prior Publication Data

US 2004/0184231 A1 Sep. 23, 2004

(30) Foreign Application Priority Data

Mar. 19, 2003 (TW) ...................................... 92204305 U

(51) Int. Cl.⁷ ................................................ G06F 1/16
(52) U.S. Cl. ...................... 361/685; 361/724; 361/726; 312/223.1; 312/223.2
(58) Field of Search ................................ 361/383–686, 361/724–727; 312/223.1, 223.2; 369/75.1

(56) References Cited

U.S. PATENT DOCUMENTS 5,777,845 A * 7/1998 Krum et al. ................ 361/685
6,193,339 B1 * 2/2001 Behl et al. ................ 312/223.2
6,388,876 B1 * 5/2002 Chen .......................... 361/685
6,460,948 B1 * 10/2002 Roesner et al. .......... 312/223.1
2003/0099094 A1 * 5/2003 Coles et al. ................ 361/726

* cited by examiner

Primary Examiner—Lynn Field
Assistant Examiner—Anthony Q. Edwards
(74) Attorney, Agent, or Firm—Rabin & Berdo, P.C.

(57) ABSTRACT

A peripheral device fixing module is described. The peripheral device fixing module quickly secures peripheral devices in a computer and especially in a computer server. The module includes a module base, a shaft, and a rotatable fixing arm. The module base fixes the peripheral devices and couples with the computer. The module base includes a first fixing device and a second fixing device to couple screw holes of the peripheral devices. The rotatable fixing arm includes a rotatable frame, a spring device, a device clasper, and a spring clasper. The spring clasper locks the rotatable fixing arm into the module base, the spring device presses a first peripheral device, such as a floppy disc drive, and the device clasper latches and presses a second peripheral device, such as an optical disc drive when the rotatable fixing arm is locked.

20 Claims, 2 Drawing Sheets

PERIPHERAL DEVICE FIXING MODULE

FIELD OF THE INVENTION

The present invention relates to a fixing module for computer peripheral devices, and especially to a fixing module for computer peripheral devices of a computer server.

BACKGROUND OF THE INVENTION

Information technology and the computer industry are highly developed now. People rely heavily on computer systems. Therefore, computer servers with high calculation capacity and high stability are important for computer systems. Due to increasingly reduced office space, area occupied by computer servers must also be reduced. Traditional computer servers must maintain a high degree of stability to serve users, and the space occupied by one computer server is therefore greater than or equal to that of a desktop computer. The management of computer servers is difficult and space utilization is tightened. Some normal companies have 2 or 3 computer servers, while others may have more than a thousand computer servers. Computer server management and space utilization become more critical in companies with more computer servers.

A 1U computer server assembled on a server rack is the mainstream computer server arrangement. Each standard layer of the rack is about 1.75 inches (about 4.5 centimeter), smaller than a conventional computer server, so that the 1U server and the rack effectively conserve occupational space of the computer servers. Moreover, the 1U servers and racks are more efficiently controlled because the 1U servers and racks can be centrally managed and easily stacked. Normally, hardware used in the 1U server is provided with a smaller size and lower height to fit the height limitation of 1.75 inches. Conventionally, each server needs input/output devices, e.g. a floppy disc drive and an optical disc drive, to read and write data for updating the system files and information thereof.

Each peripheral device usually needs about 4 screws for installation in the computer server. Accordingly, mounting the floppy disc drive and the optical disc drive in the server together needs about 8 screws. Therefore, tightening and loosening the screws spend a lot of work time in the peripheral devices assembly and disassembly process. Moreover, tightening and loosening the screws in the server having a very narrow space are very difficult.

Therefore, there is a need to assemble and disassemble peripheral devices and servers more quickly so that the work time for assembly and disassembly can be reduced and repair efficiency can be enhanced.

SUMMARY OF THE INVENTION

It is an object of the present invention to provide a peripheral device fixing module to install peripheral devices in a computer server more quickly.

It is another object of the present invention to provide a peripheral device fixing module to reduce work time for installing and repairing the peripheral devices of the computer server.

To accomplish the above objectives, the present invention provides a peripheral device fixing module to install quickly a first peripheral device and a second peripheral device in a computer. The peripheral device fixing module comprising a module base, a shaft and a rotatable fixing arm.

The module base fixes the first peripheral device and the second peripheral device and couples with the computer. The module base comprises at least one first fixing device and at least one second fixing device to couple with corresponding screw holes of the peripheral devices on one side of the module base. The shaft couples the rotatable fixing arm on the module base so that the rotatable fixing arm can rotate along the shaft. The rotatable fixing arm further comprises a rotatable frame, a spring device, a device clasper and a spring clasper.

The spring device and the device clasper mount on the rotatable frame and are disposed on another side of the module base opposite the first and the second fixing device, respectively. The spring clasper mounts on the rotatable frame and locks to the module base when the rotatable fixing arm closes on the module base in a closed position. The spring device presses the first peripheral device so that the screw holes of the first peripheral device couple with the first fixing device and the device clasper clamps onto the second peripheral device to press the second peripheral device so that the screw holes of the second peripheral device couple with the second fixing device.

The module base further comprises a sliding fixing pin, a sliding fixing plate and a locking device to couple with the computer. The computer further comprises a computer base with a sliding fixing slot to couple with the sliding fixing pin, a sliding fixing hole to couple with the sliding fixing plate, and a screw hole to couple with the locking device.

The module base further comprises a rotatable fixing arm clasper to couple with an opening of the rotatable fixing arm to enhance linking structure strength between the rotatable fixing arm and the module base. The spring device comprises a leaf spring, a coil spring, or any elastic device providing a pressure force for pushing the peripheral device. The rotatable fixing arm further comprises a third fixing device opposite the first fixing device to couple with another screw holes of the first peripheral device at the closing position.

The first peripheral device comprises a floppy disc drive and the second peripheral device comprises an optical disc drive. The computer is a computer server or any other computer that needs a floppy disc drive and an optical disc drive. The peripheral device fixing module is for use in a 1U computer server and the slim-type peripheral device of the 1U computer server.

Hence, the peripheral device fixing module according to the present invention can increase assembly efficiency of the computer server and the peripheral devices thereof and reduce the repairing work time for fixing the peripheral device of the computer server to diminish the down time of the computer server.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
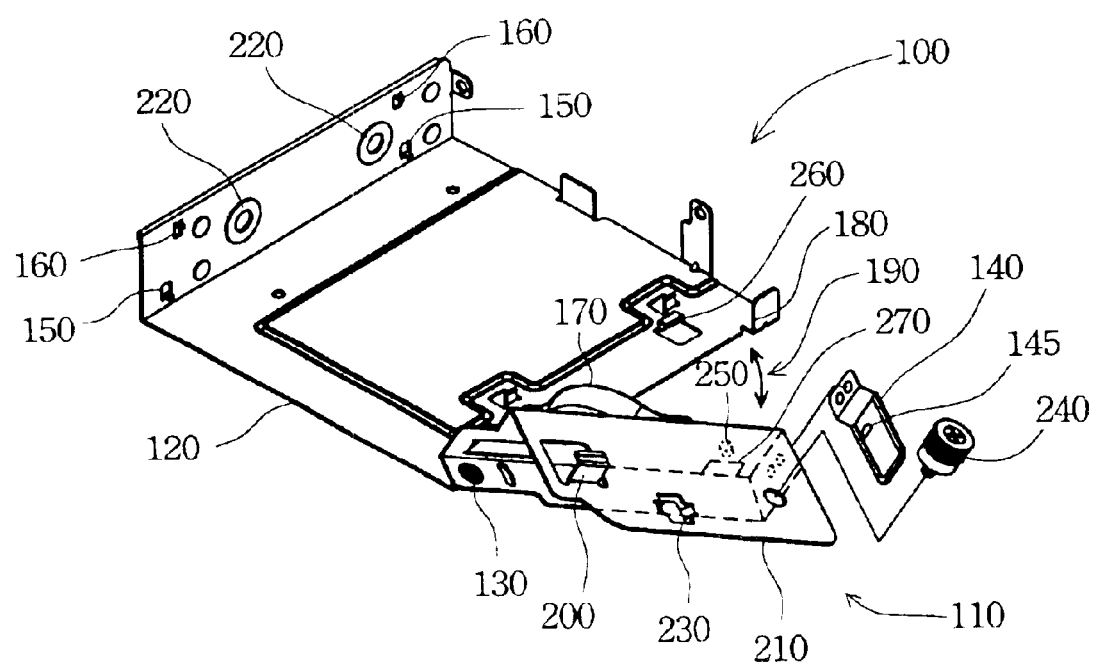
FIG. 1 is a schematic perspective view of a peripheral device fixing module according to the present invention.

FIG. 1 is a schematic perspective view of a peripheral device fixing module according to the present invention. The peripheral device fixing module 100 includes a rotatable fixing arm 110, a module base 120, and a shaft 130. A first fixing device 150 and a second fixing device 160 are formed on one side of the module base 120 opposite the rotatable fixing arm 110. The first fixing device 150 and the second fixing device 160 are utilized to fix peripheral devices, e.g. a floppy disc drive and an optical disc drive, of a computer server thereon. The rotatable fixing arm 110 couples the module base 120 with the shaft 130. Therefore, the rotatable fixing arm 110 rotates along the shaft 130 in the rotation direction 190. The rotatable fixing arm further comprises a rotatable frame 210, a spring device 170, and a spring clasper 140. The rotatable frame 210 further comprises a device clasper 200 and a third fixing device 250. When a user wishes to fix the peripheral devices, such as the floppy disc drive and/or the optical disc drive in the fixing module, the first step is to put the peripheral devices on the module base 120. Then, the rotatable fixing arm 110 turns to close the fixing module in the rotation direction 190. Because a protrusion 145 on the spring clasper 140 contacts a stationary plate 180 on the module base 120, the spring clasper 140 forms an elastic deformation so that the protrusion 145 surpasses the stationary plate 180 and then the spring clasper 140 rebounds to lock the stationary plate 180 by the protrusion 145. When the user wishes to take out the peripheral device from the fixing module, the first step is to press the spring clasper 140 to release the protrusion 145 from the stationary plate 180. Then, the rotatable fixing arm 110 is rotated to release the peripheral devices. Accordingly, the peripheral devices can easily be taken out from the fixing module.

The peripheral device fixing module further includes siding fixing pins 220, sliding fixing plate 230 and locking device 240 for efficient installation and removal from a computer server. Consequently, the peripheral device fixing module of the present invention can be quickly loaded and unloaded from the server base of the computer server.

Figure 2:
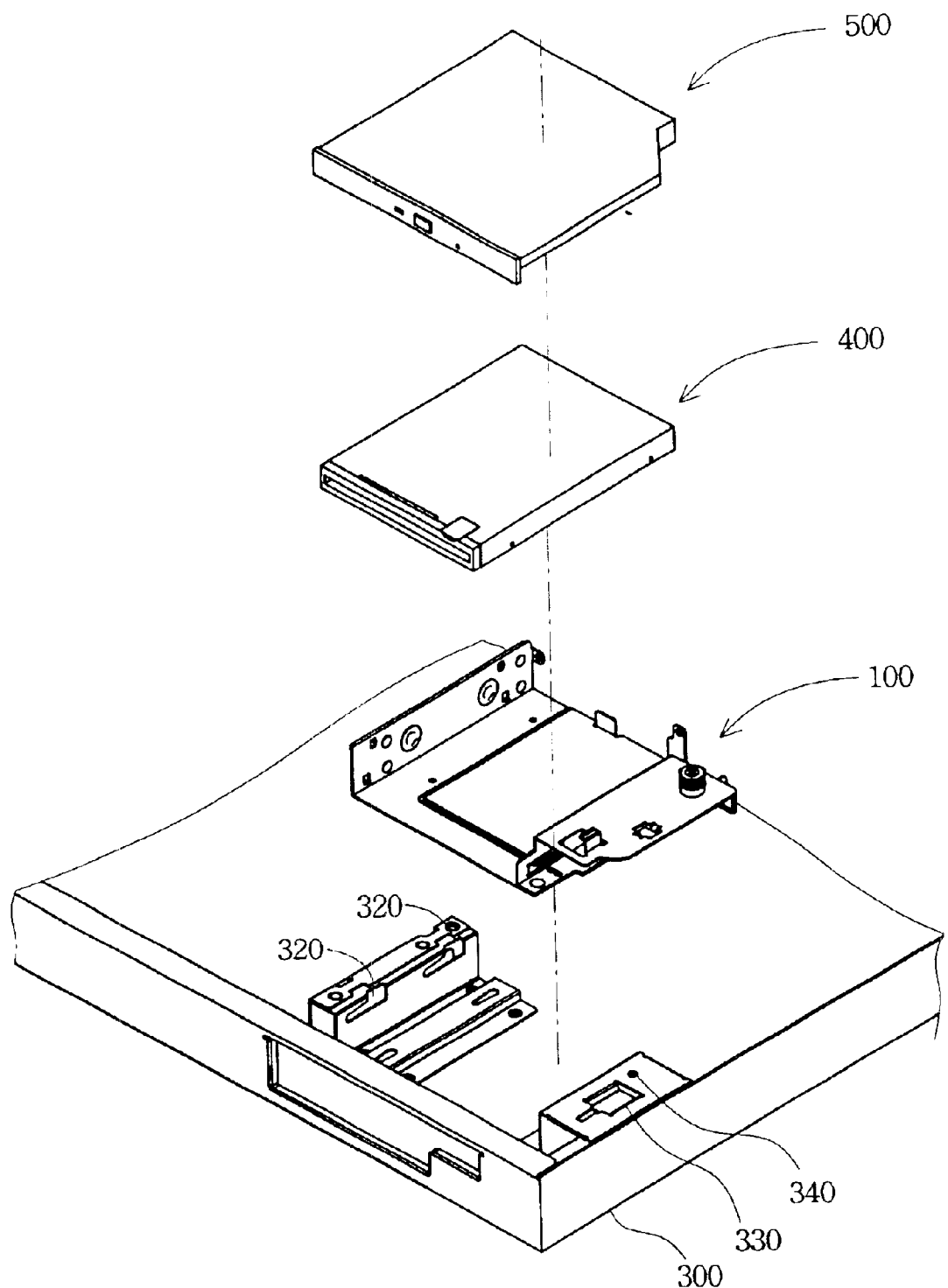
FIG. 2 is a schematic assembly relation view of the peripheral device fixing module according to the present invention and a computer server.

FIG. 2 is a schematic assembly relation view of the peripheral device fixing module according to the present invention and a computer server. Mutually referring to FIG. 1 and FIG. 2, how to load and unload the peripheral devices with the peripheral device fixing module is described, and furthermore how to install and uninstall quickly the peripheral device fixing module with the computer server is also described.

FIG. 2 illustrates a relational configuration of the computer server with a peripheral device fixing module 100 according to the present invention and peripheral devices, e.g. a first peripheral device 400 and a second peripheral device 500. The first peripheral device 400 includes a floppy disc drive or a multi-function card reader and the second peripheral device 500 includes an optical disc drive. The first step to install the first peripheral device 400 and the second peripheral device 500 into the peripheral device fixing module 100 is to unlock the spring clasper 140 and turn the rotatable fixing arm 110 for separation from the stationary plate 180. Subsequently, the first peripheral device 400 is put into the module base 120 and fixing holes of the first peripheral device 400, such as screw holes of the floppy disc drive, are aimed at the first fixing device 150. The second peripheral device 500 is subsequently put on the first peripheral device 400 and fixing holes of the second peripheral device 500, such as screw holes of the optical disc drive, are aimed at the second fixing device 160. The rotatable fixing arm 110 is turned to close on the module base 120. The spring device 170 on the rotatable fixing arm 110 pushes the first peripheral device 400 moving to couple steadily the fixing holes of the first peripheral device 400, on the other side of the first peripheral device 400, with the first fixing device 150.

While the protrusion 145 on the spring clasper 140 crosses over the stationary plate 180, the rotatable fixing arm 130 locks on the stationary plate 180 in a closed position. That is, while the rotatable fixing arm 110 is in the closed position, the spring device 170, such as a leaf spring, securely fixes the first peripheral device 400 between the rotatable fixing arm 110 and the first fixing device 150. In the meantime, the second peripheral device 500 is securely fixed between the device clasper 200 of the rotatable fixing arm 110 and the second fixing device 160.

Therefore, the peripheral device fixing module according to the present invention securely installs the peripheral device, such as the first peripheral device 400 and the second fixing device 500, thereon and securely fixes therein. If the user wishes to remove the first peripheral device 400 and the second peripheral device 500 from the peripheral device fixing module 100, the first step is to push the spring clasper 140 of the rotatable fixing arm 110 to separate the protrusion 145 thereon from the stationary plate 180. The rotatable fixing arm 110 easily rotates on the module base 120 due to a rebound force of the spring device 170. Then, the spring device 170 separates from the first peripheral device 400 and the second peripheral device 500 releases from the device clasper 200 so that both the first peripheral device 400 and the second peripheral device 500 may easily be taken out from the peripheral device fixing module 100.

The peripheral device fixing module 100 further comprises a third fixing device 250 on the rotatable fixing arm 110 to fix steadily the first peripheral device 400 in the peripheral device fixing module 100. An upper surface of the rotatable frame 210 includes a fixing plane steadily to support the second peripheral device 500 thereon when the device clasper 200 is fixing the second peripheral device 500. The peripheral device fixing module 100 further utilizes the device clasper 200 clamping the second peripheral device 500 to press the first peripheral device 400 so that the first peripheral device 400 further is steadily fixed in the peripheral device fixing module 100. The peripheral device fixing module 100 further includes a rotatable fixing arm clasper 260 on the module base 120 to clamp a corresponding opening 270 on the rotatable frame 210 when the rotatable fixing arm 110 is in the closed position so as to fix effectively the rotatable fixing arm 110 on the module base 120 and enhance linking structure strength between the rotatable fixing arm 110 and the module base 120. The corresponding opening 270 is formed on the rotatable fixing arm 110 and located another side, an opposing side of the shaft 130, of the rotatable frame 210 to enhance effectively the linking structure strength.

After the first peripheral device 400 and the second peripheral device 500 are fixed on the peripheral device fixing module 100 according to the present invention, the peripheral device fixing module 100 further utilizes a sliding fixing pin 220, a sliding fixing plate 230, and a locking device 240 to couple with the server base 300. The server base 300 includes a sliding fixing slot 320 and a sliding fixing hole 330 to couple with the sliding fixing pin 220 and the sliding fixing plate 230, respectively. When the user wishes to install the peripheral device fixing module 100 into the computer server, the first step is to aim the sliding fixing pin 220 and the sliding fixing plate 230 at the sliding fixing slot 320 and the sliding fixing hole 330 and then push therein. Subsequently, the locking device 240 locks with a corresponding screw hole 340, and therefore the peripheral device fixing module 100 is securely fixed in the computer server.

The peripheral device fixing module according to the present invention effectively improves upon the conventional fixing method using four screws for each peripheral device. Peripheral devices can be easily installed in and removed from the computer server with the use of the peripheral device fixing module, so that the computer server can be quickly assembled and repaired.

The spring device 170 can be a leaf spring, a coil spring or any spring device made of an elastic material to provide a pressure force on the first peripheral device 400. The first fixing device 150 and the second fixing device 160, and the third fixing device 250 can be directly formed on the sheet metal by stamping the sheet metal or fixing pins thereon. The locking device 240 and the screw hole 340 can be replaced by a quick coupler. As is understood by a person skilled in the art, various modifications and similar arrangements are included within the spirit and scope of the present invention as disclosed herein. The peripheral device is not limited to the an optical disc drive and a floppy disc drive or any computer peripheral devices; for example, a multi-function card reader or a hard disc can be easily installed in the peripheral device fixing module according to the present invention. Moreover, the optical disc drive further includes a CD-ROM, a CD-RW, a DVD-ROM, a DVD-RW or a COMBO.

In particular, the peripheral device fixing module according to the present invention can be used in a 1U server with slim-type peripheral devices. The peripheral device fixing module effectively reduces the assembly work time and eliminates the assembly difficulties caused by the narrow space therein. Therefore, the computer server can work more conveniently and stably because the peripheral devices can be swapped faster. As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A peripheral device fixing module mounting a first peripheral device and a second peripheral device in a computer, the peripheral device fixing module comprising:
   a module base for fixing the first peripheral device and the second peripheral device and coupling with the computer, wherein the module base comprises:
   at least one first fixing device disposed on one side of the module base and corresponding to screw holes of the first peripheral device;
   at least one second fixing device disposed on the module base with the same side of the first fixing device and corresponding to screw holes of the second peripheral device;
   a shaft coupling with the module base; and
   a rotatable fixing arm coupling with the shaft and rotating along the shaft, wherein the rotatable fixing arm further comprises:
   a rotatable frame;
   a spring device mounted on the rotatable frame and disposed on another side of the module base opposite the first fixing device;
   a device clasper mounted on the rotatable frame and disposed on another side of the module base opposite the second fixing device; and
   a spring clasper mounted on the rotatable frame, the spring clasper locking the module base when the rotatable fixing arm closes on the module base in a closed position;
   wherein the spring device only presses the first peripheral device so that the first fixing device inserts into the screw holes of the first peripheral device to fix the first peripheral device and the device clasper only presses and clamps on the second peripheral device so that the second fixing device inserts into the screw holes of the second peripheral device to fix the second peripheral device.

2. The peripheral device fixing module of claim 1, wherein the module base further comprises a sliding fixing pin to couple with the computer.

3. The peripheral device fixing module of claim 2, wherein the rotatable fixing arm further comprises a sliding fixing plate and a locking device to couple with the computer.

4. The peripheral device fixing module of claim 3, wherein the computer further comprises a computer base, the computer base comprising:
   a sliding fixing slot to couple with the sliding fixing pin;
   a sliding fixing hole to couple with the sliding fixing plate; and
   a screw hole to couple with the locking device.

5. The peripheral device fixing module of claim 1, wherein the module base further comprises a rotatable fixing arm clasper to couple an opening of the rotatable fixing arm to enhance linking structure strength between the rotatable fixing arm and the module base.

6. The peripheral device fixing module of claim 1, wherein the spring device comprises a leaf spring.

7. The peripheral device fixing module of claim 1, wherein the spring device comprises a coil spring.

8. The peripheral device fixing module of claim 1, wherein the rotatable fixing arm further comprises a third fixing device opposite the first fixing device to couple with another screw holes of the first peripheral device at the closing position.

9. The peripheral device fixing module of claim 1, wherein the first peripheral device comprises a floppy disc drive.

10. The peripheral device fixing module of claim 1, wherein the second peripheral device comprises an optical disc drive.

11. A computer server with a peripheral device fixing module, the computer server comprising:
   a computer server base, the computer server base comprising:
   at least one sliding fixing slot;
   a sliding fixing hole; and
   a screw hole; and
   a peripheral device fixing module for fixing a first peripheral device and a second peripheral device and coupling with the computer server base to fix in the computer server, the peripheral device fixing module comprising:
   a module base for fixing the first peripheral device and the second peripheral device and coupling with the computer server base, wherein the module base further comprises:

at least one first fixing device disposed on one side of the module base and corresponding to screw holes of the first peripheral device; and at least one second fixing device disposed on the module base with the same side of the first fixing device and corresponding to screw holes of the second peripheral device;

a shaft coupling with the module base; and a rotatable fixing arm coupling with the shaft and rotating along the shaft, wherein the rotatable fixing arm further comprises:

a rotatable frame;

a spring device mounted on the rotatable frame and disposed on another side of the module base opposite the first fixing device;

a device clasper mounted on the rotatable frame and disposed on another side of the module base opposite the second fixing device; and a spring clasper mounted on the rotatable frame, the spring clasper locking the module base when the rotatable fixing arm closes on the module base in a closed position;

at least one sliding fixing pin for coupling with the at least one sliding fixing slot;

a sliding fixing plate for coupling with the sliding fixing hole; and a locking device for coupling with the screw hole;

wherein the spring device only presses the first peripheral device so that the first fixing device inserts into the screw holes of the first peripheral device to fix the first peripheral device and the device clasper only presses and clamps on the second peripheral device so that the second fixing device inserts into the screw holes of the second peripheral device to fix the second peripheral device.

12. The computer server of claim 11, wherein the module base further comprises a rotatable fixing arm clasper to couple an opening of the rotatable fixing arm to enhance linking structure strength between the rotatable fixing arm and the module base.

13. The computer server of claim 11, wherein the spring device comprises a leaf spring.

14. The computer server of claim 11, wherein the spring device comprises a coil spring.

15. The computer server of claim 11, wherein the rotatable fixing arm further comprises a third fixing device opposite the first fixing device to couple with another screw holes of the first peripheral device at the closing position.

16. The computer server of claim 11, wherein the first peripheral device comprises a floppy disc drive.

17. The computer server of claim 11, wherein the second peripheral device comprises an optical disc drive.

18. A 1U computer server with a fixing module of a floppy disc drive and a optical disc drive, the 1U computer server comprising:

a computer server base, the computer server base comprising:

at least one sliding fixing slot;

a sliding fixing hole; and a screw hole; and a peripheral device fixing module for fixing the floppy disc drive and the optical disc drive and coupling with the computer server base to fix in the 1U computer server, the peripheral device fixing module comprising:

a module base for fixing the floppy disc drive and the optical disc drive and coupling with the computer server base, wherein the module base further comprises:

at least one floppy disc drive fixing device disposed on one side of the module base and corresponding to screw holes of the floppy disc drive; and at least one optical disc drive fixing device disposed on the module base with the same side of the floppy disc drive fixing device and corresponding to screw holes of the optical disc drive;

a shaft coupling with the module base; and a rotatable fixing arm coupling with the shaft and rotating along the shaft, wherein the rotatable fixing arm further comprises:

a rotatable frame;

a spring device mounted on the rotatable frame and disposed on another side of the module base opposite the floppy disc drive fixing device;

a device clasper mounted on the rotatable frame and disposed on another side of the module base opposite the optical disc drive fixing device; and a spring clasper mounted on the rotatable frame, the spring clasper locking the module base when the rotatable fixing arm closes on the module base in a closed position;

at least one sliding fixing pin for coupling with the at least one sliding fixing slot;

a sliding fixing plate for coupling with the sliding fixing hole; and a locking device for coupling with the screw hole;

wherein the spring device only presses the floppy disc drive so that the floppy disc drive fixing device inserts into the screw holes of the floppy disc drive to fix the floppy disc drive and the device clasper only presses and clamps on the optical disc drive the optical disc drive fixing device inserts into the screw holes of the optical disc drive to fix the optical disc drive.

19. The 1U computer server of claim 18, wherein the module base further comprises a rotatable fixing arm clasper to couple an opening of the rotatable fixing arm to enhance linking structure strength between the rotatable fixing arm and the module base.

20. The 1U computer server of claim 18, wherein the rotatable fixing arm further comprises a third fixing device opposite the floppy disc drive fixing device to couple with other screw holes of the floppy disc drive in the closed position.

* * * * *